United States Patent
Gao et al.

(10) Patent No.: US 11,178,233 B2
(45) Date of Patent: Nov. 16, 2021

(54) SERVICE ORCHESTRATION METHOD AND APPARATUS, AND SERVER

(71) Applicant: HUAWEI TECHNOLOGIES CO., LTD., Shenzhen (CN)

(72) Inventors: Zhijiang Gao, Shenzhen (CN); Yi Lin, Dongguan (CN); Xin Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 16/442,459

(22) Filed: Jun. 15, 2019

(65) Prior Publication Data
US 2019/0306256 A1    Oct. 3, 2019

Related U.S. Application Data

(63) Continuation of application No. PCT/CN2016/110158, filed on Dec. 15, 2016.

(51) Int. Cl.
*G06F 15/173*    (2006.01)
*H04L 29/08*    (2006.01)
(Continued)

(52) U.S. Cl.
CPC .......... *H04L 67/16* (2013.01); *G06F 9/5088* (2013.01); *H04L 41/0893* (2013.01);
(Continued)

(58) Field of Classification Search
None
See application file for complete search history.

(56) References Cited

U.S. PATENT DOCUMENTS

| 6,263,358 B1 * | 7/2001 | Lee | .......................... G06F 8/458 |
| | | | 718/100 |
| 8,224,472 B1 * | 7/2012 | Maluf | ............ G06Q 10/063116 |
| | | | 700/97 |

(Continued)

FOREIGN PATENT DOCUMENTS

| CN | 101729588 A | 6/2010 |
| CN | 103513976 A | 1/2014 |

(Continued)

OTHER PUBLICATIONS

Bueno Iris et al: "An Open NaaS Based SDN Framework for Dynamic QoS Control", 2013 IEEE SDN for Future Networks and Services(SDN4FNS), IEEE, Nov. 11, 2013, pp. 1-7, XP032540950.

(Continued)

*Primary Examiner* — Phuoc H Nguyen
(74) *Attorney, Agent, or Firm* — Hauptman Ham, LLP

(57) ABSTRACT

Embodiments can provide a service orchestration method and apparatus, and a server. In the service orchestration method, a service flowchart can be obtained. The service flowchart may include a plurality of operation model identifiers and a logical connection relationship among the plurality of operation model identifiers. The logical connection relationship may be an execution sequence in the service flowchart. In this method, a scheduling parameter corresponding to each operation model identifier can be obtained. When the scheduling parameter indicates a live network resource for executing the service flowchart, a live network status can be obtained by using a control plane. Based on the obtained live network status, whether the live network resource can be obtained can be verified. When the verification succeeds, based on the logical connection relationship and the scheduling parameter that corresponds to (Continued)

each operation model identifier, executable code for executing the service flowchart can be generated.

16 Claims, 5 Drawing Sheets

(51) Int. Cl.
*H04L 12/24* (2006.01)
*G06F 9/50* (2006.01)
*H04L 12/715* (2013.01)

(52) U.S. Cl.
CPC .......... *H04L 41/0896* (2013.01); *H04L 41/12* (2013.01); *H04L 41/5051* (2013.01); *H04L 41/5054* (2013.01); *H04L 67/325* (2013.01); *H04L 67/327* (2013.01); *H04L 67/34* (2013.01); *H04L 67/36* (2013.01); *H04L 41/0876* (2013.01); *H04L 45/64* (2013.01)

(56) References Cited

U.S. PATENT DOCUMENTS

| | | | |
|---|---|---|---|
| 9,389,916 B1* | 7/2016 | Miller | G06F 11/3433 |
| 9,588,822 B1* | 3/2017 | Shih | G06F 9/542 |
| 2003/0120709 A1* | 6/2003 | Pulsipher | G06F 9/4881 |
| | | | 718/106 |
| 2007/0174101 A1* | 7/2007 | Li | G06Q 10/063 |
| | | | 705/7.26 |
| 2011/0321051 A1* | 12/2011 | Rastogi | G06F 9/4881 |
| | | | 718/102 |
| 2014/0032255 A1* | 1/2014 | Hegazi | G06Q 10/06312 |
| | | | 705/7.22 |
| 2015/0244775 A1* | 8/2015 | Vibhor | G06Q 10/00 |
| | | | 709/203 |
| 2016/0147955 A1* | 5/2016 | Shah | G16H 40/20 |
| | | | 705/3 |
| 2016/0294643 A1 | 10/2016 | Kim | |
| 2017/0005882 A1 | 1/2017 | Tao et al. | |
| 2017/0048115 A1 | 2/2017 | Wang | |
| 2017/0052814 A1* | 2/2017 | Aguiar | G06F 9/5083 |
| 2017/0244611 A1 | 8/2017 | Wang | |

FOREIGN PATENT DOCUMENTS

| | | |
|---|---|---|
| CN | 104360842 A | 2/2015 |
| CN | 104811326 A | 7/2015 |
| CN | 104978172 A | 10/2015 |
| CN | 105207798 A | 12/2015 |
| CN | 106209875 A | 12/2016 |
| EP | 3163797 A1 | 5/2017 |
| WO | 2015196813 A1 | 12/2015 |

OTHER PUBLICATIONS

B. Martini et al., An SDN orchestrator for resources chaining in cloud data centers. 2014 European Conference on Networks and Communications (EuCNC), Aug. 25, 2014, 5 pages.

* cited by examiner

Obtain a service flowchart of a to-be-orchestrated service, where the to-be-orchestrated service is used to set a management and control operation for a transport network, the service flowchart includes a plurality of operation model identifiers and a logical connection relationship among the plurality of operation model identifiers, and the logical connection relationship is an execution sequence in the service flowchart ⎯ 301

Obtain a scheduling parameter that corresponds to each operation model identifier, and when the scheduling parameter is a live network resource that needs to be provided to execute the service flowchart, obtain a live network status by using a control layer, and verify, based on the obtained live network status, whether the live network resource that needs to be provided can be obtained ⎯ 302

When the verification succeeds, generate, based on the logical connection relationship and the scheduling parameter that corresponds to each operation model identifier, executable code for executing the service flowchart ⎯ 303

FIG. 3

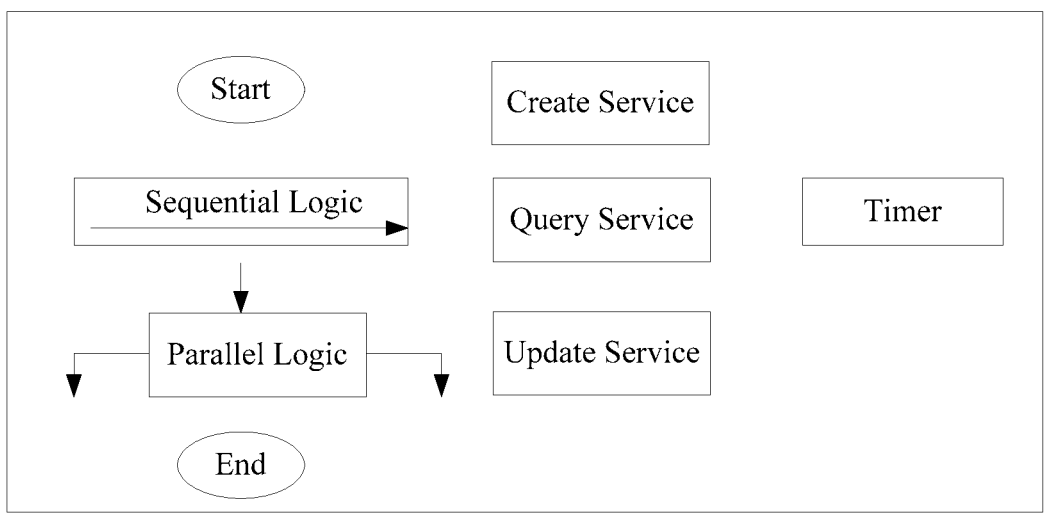

FIG. 4

SERVICE ORCHESTRATION METHOD AND APPARATUS, AND SERVER

CROSS-REFERENCE TO RELATED APPLICATIONS

This application is a continuation of International Application No. PCT/CN2016/110158, filed on Dec. 15, 2016, the disclosure of which is hereby incorporated by reference in its entirety.

TECHNICAL FIELD

This application relates to the field of communications technologies, and in particular, to a service orchestration method and apparatus, and a server.

BACKGROUND

Since a software-defined networking (SDN for short) technology was born and applied to a transport network, T-SDN continuously evolves in a direction of constructing a next-generation "software" transport network. SDN implements network functions virtualization, network management simplification, and network deployment automation by using an open programming interface, so as to meet an urgent demand of an operator for intelligentization, openness, and innovation.

With introduction of a T-SDN controller, there is a "brain" for centralized control in the transport network, and a physical device can be directly controlled by using a southbound interface. Based on centralized control, an SDN focus begins to gradually change from the southbound interface of the controller to a northbound interface of the controller in the industry. By virtue of a standardized transport network model and technologies such as a northbound API and an open-source controller, it is expected to break closure of a conventional transport network, and open a transport network capability by using a standard northbound interface, so as to really implement network openness.

In the face of growth of various Internet applications, an operator needs to continuously expand a capacity and a scale of a transport network of the operator, to ensure that there is enough bandwidth to meet explosively increasing traffic requirements. In the face of massive devices and services that continuously increase, the operator needs to perform differentiated operation and maintenance for different network scenarios and service requirements. Therefore, an operation and maintenance scenario is more complex.

Because a function requirement related to a northbound interface and a function requirement related to SDN service orchestration are not fully explored, difficulty in service orchestration and programming in SDN is still great, and an operation and maintenance engineer cannot perform service orchestration and programming in SDN online. To meet variable service requirements, an equipment vendor or a third-party software vendor still develops a new service or updates a service for the operator based on an original business support system or operations support system.

For example, if the operator has a new operation and maintenance requirement or requires a new service, the operator usually needs to describe the requirement of the operator to the equipment vendor, and the equipment vendor performs customized function development. This development process is usually a long and complex process. In an example in which a waterfall model is used, after a development requirement of the operator arrives, activities such as analysis, design, coding, and test need to be performed before final delivery. An entire period usually includes several months. If the requirement changes during development, the entire development process needs to be repeated. The entire process is very time-consuming. After completing development, the equipment vendor further needs to perform complex operations such as software upgrade and configuration in an operator network, to finally provide a required service for the operator. An operation and maintenance engineer of the operator manually operates a business support system or an operations support system having a new service function, and implements operation and maintenance on a physical device by using a southbound interface.

In conclusion, in the face of current service requirements that are flexible and variable, difficulty in service orchestration and programming in SDN is still great, and an operation and maintenance engineer cannot perform service orchestration and programming in SDN online.

SUMMARY

Embodiments of this application provide a service orchestration method and apparatus, and a server, to resolve a prior art technical problem that in the face of current service requirements that are flexible and variable, there is still great difficulty in service orchestration and programming in SDN, and an operation and maintenance engineer cannot perform service orchestration and programming in SDN online.

According to a first aspect, an embodiment of this application provides a service orchestration method, and the method includes:

obtaining a service flowchart of a to-be-orchestrated service, where the to-be-orchestrated service is used to set a management and control operation for a transport network, the service flowchart includes a plurality of operation model identifiers and a logical connection relationship among the plurality of operation model identifiers, and the logical connection relationship is an execution sequence in the service flowchart;

obtaining a scheduling parameter that corresponds to each operation model identifier, and when the scheduling parameter is a live network resource that needs to be provided to execute the service flowchart, obtain a live network status by using a control plane, and verify, based on the obtained live network status, whether the live network resource can be obtained; and when the verification succeeds, generating, based on the logical connection relationship and the scheduling parameter that corresponds to each operation model identifier, executable code for executing the service flowchart.

In this embodiment, the service flowchart including the plurality of operation model identifiers and the logical connection relationship among the plurality of operation model identifiers is constructed, so that preliminary orchestration of the to-be-orchestrated service is simplified. For the scheduling parameter that is set for an operation corresponding to each operation model identifier, when the scheduling parameter is a live network resource that needs to be provided to perform the corresponding operation, whether there is permission to obtain or there is the live network resource that needs to be provided to support execution of the orchestrated service flowchart may be verified online by interacting with the control plane. When the online verification succeeds, the orchestrated service flowchart is compiled into the executable code, so that online service compilation is implemented. Compared with the prior art, in an execution procedure in which the to-be-orchestrated service is preliminarily orchestrated by orchestrating the service flowchart, difficulty in service orchestration and compilation can be reduced. Feasibility verification on the orchestrated service is performed online through interaction with the control plane, and an orchestrated service that succeeds in the feasibility verification is further compiled, so that online orchestration and compilation of the customized service can be efficiently completed. Based on this, online orchestration and compilation can be performed based on different service requirements, so that current service requirements that are flexible and variable are met.

Optionally, the plurality of operation model identifiers and the logical connection relationship are displayed on a user operation interface in a graphical manner; and the obtaining a service flowchart of a to-be-orchestrated service includes:

determining, based on an operation instruction of a user on the user operation interface, the plurality of operation model identifiers and the logical connection relationship that are selected by the user; and determining the service flowchart including the plurality of operation model identifiers and the logical connection relationship.

Optionally, in this embodiment, when the plurality of operation model identifiers and the logical connection relationship are displayed on the user operation interface in the graphical manner, a graphical service programming environment can be provided for the user, so that the user can quickly respond to a customized service requirement, and service orchestration difficulty is reduced.

Optionally, after the obtaining a scheduling parameter that corresponds to each operation model identifier, the method further includes:

performing logic verification on the logical connection relationship, and performing semantic verification on the scheduling parameter.

Optionally, in this embodiment, logic verification is performed on the logical relationship of the service, and semantic and syntax verification is performed on the scheduling parameter, so that service orchestration feasibility can be preliminarily ensured.

Optionally, the obtaining a live network status by using a control plane, and verifying, based on the obtained live network status, whether the live network resource can be obtained includes:

obtaining the live network status through a pre-created interaction interface for interaction with the control plane;

querying, based on the live network status, whether the live network resource exists in the live network status; and/or determining, based on the live network status, whether there is permission to apply for the live network resource.

SDN network-wide resources are obtained through the pre-created interaction interface for interaction with the control plane, and feasibility of the preliminarily orchestrated service flowchart is verified based on the obtained resources. Therefore, feasibility of the preliminarily orchestrated service can be verified online. In addition, a convenient service orchestration innovation platform can be provided for an operator in a graphical programming manner, so as to facilitate service innovation of the operator. The innovation platform integrates a network control development environment, a service provision development environment, and a service integration development environment, can provide the operator with a complete solution from innovative design to simple development, rapid deployment, and automatic maintenance, and can implement fast service customization for the operator and leisurely cope with complex operation and maintenance requirements. Compared with the prior art, complete openness of an application plane in an SDN architecture is really implemented, and current service orchestration requirements that are flexible and variable can be met.

Optionally, the generating, based on the logical connection relationship and the scheduling parameter that corresponds to each operation model identifier, executable code for executing the service flowchart includes:

generating, based on the scheduling parameter that corresponds to each operation model identifier, a script file of an operation that corresponds to each operation model identifier;

generating, based on the logical connection relationship and the script file of the operation that corresponds to each operation model identifier, the executable code for performing all operations in the service flowchart; and creating an interaction interface for interaction with the control plane, where the interaction interface is configured to apply to the control plane for the live network resource that needs to be provided to run the executable code.

In this embodiment, each operation model identifier corresponds to one operation model, each operation model is an open-source basic component or enhanced component based on an SDN system architecture, and when being invoked, each open-source basic component or enhanced component may be converted into a script file (equivalent to a standard execution language of a business process) that corresponds to the operation model. Correspondingly, the logical connection relationship among the operation model identifiers is an open-source logical component based on the SDN system architecture. When each logical component is invoked, a script file that describes a logical relationship among a plurality of operation models can be formed. Based on this, it can be convenient to process the preliminarily orchestrated service flowchart into the business process execution language, and convert the business process execution language into the executable code, thereby reducing service compilation difficulty.

Further, after the generating executable code for executing the service flowchart, the method further includes:

obtaining, through the interaction interface, the live network resource obtained through application;

running the executable code based on the live network resource obtained through application; and assisting, through the created interaction interface and based on the live network resource obtained through application, the control plane in completing resource management tasks of querying a bottom-layer resource, reserving a bottom-layer resource, and notifying a bottom-layer resource change.

In this embodiment, the resource required for running the orchestrated service is applied for through the interaction interface used for interaction between a server and the control plane, for example, an NBI in an SDN architecture, so that a function of the NBI can be extended. The resource required for running the orchestrated service is applied for from the SDN control plane through the interaction interface, and the orchestrated service is run based on the resource obtained through application, so that online running of the orchestrated service can be really implemented.

According to a second aspect, an embodiment of this application provides a service orchestration apparatus, configured to implement any method in the first aspect. The service orchestration apparatus includes corresponding function modules, separately configured to implement steps in the foregoing method.

According to a third aspect, an embodiment of this application provides a server, including a processor, a transceiver, and a memory.

The memory is configured to store an instruction, the processor is configured to: execute the instruction stored in the memory, and control the transceiver to receive a signal and send a signal, and when the processor executes the instruction stored in the memory, the processor is configured to perform any method in the first aspect.

BRIEF DESCRIPTION OF DRAWINGS

FIG. 3 is a schematic flowchart of a service orchestration method according to an embodiment of this application;

FIG. 4 is a schematic diagram of graphical representation of an operation model identifier and a logical connection relationship according to an embodiment of this application;

DESCRIPTION OF EMBODIMENTS

The following describes technical solutions of this application with reference to accompanying drawings.

Figure 1:
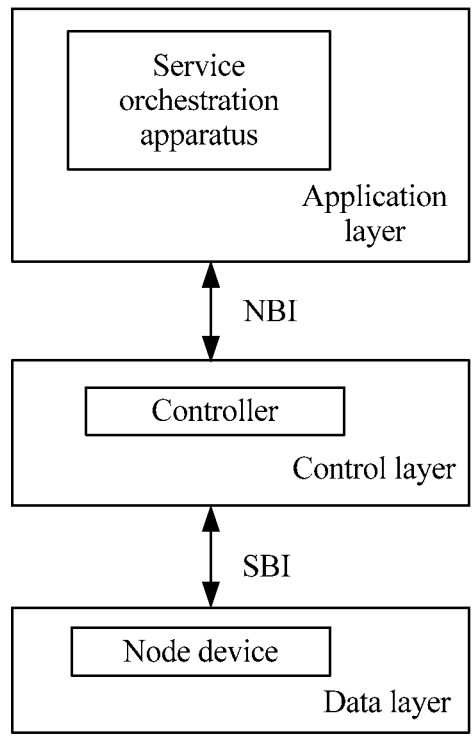
FIG. 1 is a schematic diagram of an SDN system architecture according to an embodiment of this application.

A service orchestration method in various embodiments is applicable to software-defined networking SDN service orchestration. FIG. 1 is a diagram of an SDN system architecture according to one embodiment. In this embodiment, the SDN system architecture includes an application plane, a control plane, and a data plane. A controller is deployed at the control plane. The controller integrates a centralized algorithm, and has automatic network-wide centralized control functions such as network planning, resource optimization, and performance evaluation. An NBI, namely, a northbound interface, is opened between the application plane and the control plane, and an SBI, namely, a southbound interface, is opened between the control plane and the data plane.

In the SDN system architecture shown in FIG. 1, network-wide physical devices are deployed at the data plane. These physical devices are located in a southbound part of the SDN architecture. The controller communicates and interacts with these devices by using the SBI, to directly control these devices. Compared with an existing SDN architecture, a service orchestration apparatus is added to the application plane in the SDN architecture applicable to this embodiment. The service orchestration apparatus is located in a northbound part of the SDN architecture, and communicates and interacts with the controller by using the NBI.

The service orchestration apparatus serves as a bridge between the SDN application plane and the control plane, and provides an open platform development and management capability for an end user, an application developer, and an administrator by using the NBI, so as to further meet a requirement for SDN development, operation, and maintenance.

Based on the system architecture shown in FIG. 1, service orchestration in this embodiment is service orchestration performed based on the SDN system architecture. A to-be-orchestrated service is first determined based on a service requirement of a user. The to-be-orchestrated service is determined based on the service requirement and execution procedure is used to set a management and control operation for a transport network. An execution procedure of the to-be-orchestrated service is preliminarily determined based on the determined to-be-orchestrated service. The management and control operation that is set herein includes a plurality of types of network tasks, which may be various management and control tasks for a network device or a network resource in the SDN architecture. An execution procedure of a service usually includes a plurality of operation steps and an execution sequence of the plurality of operation steps. Subsequently, whether a corresponding network resource can be obtained from the SDN system architecture through application to support smooth execution of the to-be-orchestrated service is determined based on the execution procedure of the to-be-orchestrated service. Then, when it is determined that the corresponding network resource can be obtained from the SDN system architecture through application to support the to-be-orchestrated service, the execution procedure of the to-be-orchestrated service is compiled, to form executable code. Finally, based on the compiled executable code, a corresponding network resource is applied for from the SDN system architecture to run the compiled executable code, so as to meet the service requirement of the user.

Figure 2:
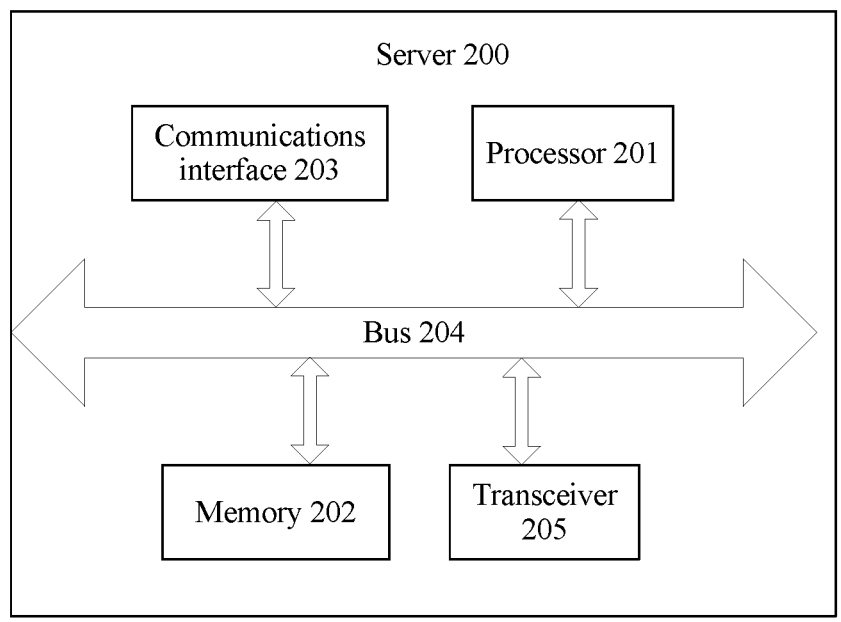
FIG. 2 is a schematic structural diagram of a server configured to execute a service orchestration method procedure according to an embodiment of this application.

For example, FIG. 2 is a schematic structural diagram of a server according to an embodiment of this application. The server is configured to execute a service orchestration method procedure in one embodiment. As shown in FIG. 2, the server includes a processor 201 and a transceiver 205. In some embodiments, the server further includes a memory 202 and a communications interface 203. The processor 201, the memory 202, the communications interface 203, and the transceiver 205 are connected to each other by using a bus 204. The memory may be integrated into the processor 201, or may be independent of the processor 201.

The bus 204 may be a peripheral component interconnect (PCI for short) bus, an extended industry standard architecture (EISA for short) bus, or the like. The bus 204 may be classified into an address bus, a data bus, a control bus, and the like. For ease of representation, only one thick line is used to represent the bus in FIG. 2, but this does not mean that there is only one bus or only one type of bus.

The memory 202 may include a volatile memory, such as a random-access memory (RAM for short); or the memory may include a non-volatile memory, such as a flash memory, a hard disk drive (HDD for short), or a solid state drive (SSD for short); or the memory 202 may include a combination of the foregoing types of memories.

The communications interface 203 may be a wired communications interface, a wireless communications interface, or a combination thereof. For example, the wired communications interface may be an Ethernet interface. The Ethernet interface may be an optical interface, an electrical interface, or a combination thereof. The wireless communications interface may be a WLAN interface.

The processor 201 may be a central processing unit (CPU for short), a network processor (NP for short), or a combination of a CPU and an NP.

The processor 201 may further include a hardware chip. The hardware chip may be an application-specific integrated circuit (ASIC for short), a programmable logic device (PLD for short), or a combination thereof. The PLD may be a complex programmable logical device (CPLD for short), a field-programmable gate array (FPGA for short), generic array logic (GAL for short), or any combination thereof.

The memory 202 in this embodiment of this application is configured to store an instruction, the processor 201 is configured to: execute the instruction stored in the memory 202, and control the transceiver 205 to receive a signal and send a signal, and when the processor 201 executes the instruction stored in the memory 202, the processor 201 is configured to:

obtain a service flowchart of a to-be-orchestrated service, where the to-be-orchestrated service is used to set a management and control operation for a transport network, the service flowchart includes a plurality of operation model identifiers and a logical connection relationship among the plurality of operation model identifiers, and the logical connection relationship is an execution sequence in the service flowchart;

obtain a scheduling parameter that corresponds to each operation model identifier, and when the scheduling parameter is a live network resource that needs to be provided to execute the service flowchart, obtain a live network status by using a control plane, and verify, based on the obtained live network status, whether the live network resource can be obtained; and when the verification succeeds, generate, based on the logical connection relationship and the scheduling parameter that corresponds to each operation model identifier, executable code for executing the service flowchart.

In this embodiment, the processor 201 constructs the service flowchart including the plurality of operation model identifiers and the logical connection relationship among the plurality of operation model identifiers, so that preliminary orchestration of the to-be-orchestrated service is simplified. For a scheduling parameter that is set for an operation corresponding to each operation model identifier, when the scheduling parameter is a live network resource that needs to be provided to perform the corresponding operation, the processor 201 may verify, online by interacting with the control plane, whether there is permission to obtain or there is the live network resource that needs to be provided to support execution of the orchestrated service flowchart. When the online verification succeeds, the processor 201 compiles the orchestrated service flowchart into the executable code, so that online service compilation is implemented. Compared with the prior art, in an execution procedure in which the to-be-orchestrated service is preliminarily orchestrated by orchestrating the service flowchart, difficulty in service orchestration and compilation can be reduced. Feasibility verification on the orchestrated service is performed online through interaction with the control plane, and an orchestrated service that succeeds in the feasibility verification is further compiled, so that online orchestration and compilation of the customized service can be efficiently completed. Based on this, online orchestration and compilation can be performed based on different service requirements, so that current service requirements that are flexible and variable are met.

In this embodiment, the plurality of operation model identifiers and the logical connection relationship are displayed on a user operation interface in a graphical manner. The processor 201 is configured to: determine, based on an operation instruction of a user on the user operation interface, the plurality of operation model identifiers and the logical connection relationship that are selected by the user, and determine the service flowchart including the plurality of operation model identifiers and the logical connection relationship.

When the plurality of operation model identifiers and the logical connection relationship are displayed on the user operation interface in the graphical manner, a graphical service programming environment can be provided for the user, so that the user can quickly respond to a customized service requirement, and service orchestration difficulty is reduced.

In some embodiments, after obtaining the scheduling parameter that corresponds to each operation model identifier, the processor 201 is further configured to: perform logic verification on the logical connection relationship, and perform semantic verification on the scheduling parameter.

Logic verification is performed on the logical relationship of the service, and semantic and syntax verification is performed on the scheduling parameter, so that service orchestration feasibility can be preliminarily ensured.

In some embodiments, the processor 201 is configured to: obtain the live network status through a pre-created interaction interface for interaction with the control plane; query, based on the live network status, whether the live network resource exists in the live network status; and/or determine, based on the live network status, whether there is permission to apply for the live network resource.

In some embodiments, the processor 201 may interact with a central controller at the control plane, the processor 201 may interact with an orchestrator at the control plane, or the processor 201 may interact with a network management system at the control plane.

In some embodiments, the interaction interface between the processor 201 and the control plane is an NBI in an SDN architecture. In this way, a function of the NBI can be further extended.

In some embodiments, the interaction interface for interacting with the control plane may be a TAPI standard interface specified by the Open Networking Foundation (ONF for short) organization.

In some embodiments, the interaction interface for interacting with the control plane may be an IETF (Internet Engineering Task Force, IETF for short) standard interface.

SDN network-wide resources are obtained through the pre-created interaction interface for interaction with the control plane, and feasibility of the preliminarily orchestrated service flowchart is verified based on the obtained resources. Therefore, feasibility of the preliminarily orchestrated service can be verified online. In addition, a convenient service orchestration innovation platform can be provided for an operator in a graphical programming manner, so as to facilitate service innovation of the operator. The innovation platform integrates a network control development environment, a service provision development environment, and a service integration development environment, can provide the operator with a complete solution from innovative design to simple development, rapid deployment, and automatic maintenance, and can implement fast service customization for the operator and leisurely cope with complex operation and maintenance requirements. Compared with the prior art, complete openness of an application plane in an SDN architecture is really implemented, and current service orchestration requirements that are flexible and variable can be met.

In some embodiments, the processor 201 is configured to: generate, based on the scheduling parameter that corresponds to each operation model identifier, a script file of an operation that corresponds to each operation model identifier; generate, based on the logical connection relationship and the script file of the operation that corresponds to each operation model identifier, the executable code for performing all operations in the service flowchart; and create an interaction interface for interaction with the control plane, where the interaction interface is configured to apply to the control plane for the live network resource that needs to be provided to run the executable code.

To reduce service compilation difficulty, in this embodiment of this application, each operation model identifier corresponds to one operation model, each operation model is an open-source basic component or enhanced component based on an SDN system architecture, and when being invoked, each open-source basic component or enhanced component may be converted into a script file (equivalent to a standard execution language of a business process) that corresponds to the operation model. Correspondingly, the logical connection relationship among the operation model identifiers is an open-source logical component based on the SDN system architecture. When each logical component is invoked, a script file that describes a logical relationship among a plurality of operation models can be formed. Based on this, it can be convenient to process the preliminarily orchestrated service flowchart into the business process execution language, and convert the business process execution language into the executable code, thereby reducing service compilation difficulty. For a mapping relationship between a basic component or an enhanced component and an operation model identifier in the service flowchart, and a mapping relationship between a logical component and the logical connection relationship among the plurality of operation model identifiers, refer to a method procedure.

In some embodiments, after generating the executable code for executing the service flowchart, the processor 201 is further configured to: obtain, through the interaction interface, the live network resource obtained through application; run the executable code based on the live network resource obtained through application; and assist, through the created interaction interface and based on the live network resource obtained through application, the control plane in completing resource management tasks of querying a bottom-layer resource, reserving a bottom-layer resource, and notifying a bottom-layer resource change.

The resource required for running the orchestrated service is applied for through the interaction interface used for interaction between the server and the control plane, for example, an NBI in an SDN architecture, so that a function of the NBI can be extended. The resource required for running the orchestrated service is applied for from the SDN control plane through the interaction interface, and the orchestrated service is run based on the resource obtained through application, so that online running of the orchestrated service can be really implemented.

Based on a same inventive concept, a service orchestration method in an embodiment of this application is orchestration and compilation performed based on an execution procedure of a to-be-orchestrated service. For example, FIG. 3 is a schematic flowchart of a method according to an embodiment of this application, and a procedure of the method is executed by a processor deployed on a server to perform service orchestration. As shown in FIG. 3, the method includes the following steps:

Step 301: Obtain a service flowchart of a to-be-orchestrated service, where the to-be-orchestrated service is used to set a management and control operation for a transport network, the service flowchart includes a plurality of operation model identifiers and a logical connection relationship among the plurality of operation model identifiers, and the logical connection relationship is an execution sequence in the service flowchart.

Step 302: Obtain a scheduling parameter that corresponds to each operation model identifier, and when the scheduling parameter is a live network resource that needs to be provided to execute the service flowchart, obtain a live network status by using a control plane, and verify, based on the obtained live network status, whether the live network resource that needs to be provided can be obtained.

Step 303: When the verification succeeds, generate, based on the logical connection relationship and the scheduling parameter that corresponds to each operation model identifier, executable code for executing the service flowchart.

Because an execution procedure of the to-be-orchestrated service includes a plurality of operations and an execution sequence of the plurality of operations, to simplify orchestration and compilation of the to-be-orchestrated service, an execution procedure of the plurality of operations in the to-be-orchestrated service is constructed in a manner of constructing the service flowchart in this embodiment of this application. The constructed service flowchart includes the plurality of preset operation model identifiers and the logical connection relationship among the plurality of operation model identifiers. The plurality of operation model identifiers represent execution steps of the plurality of operations in the to-be-orchestrated service. The logical connection relationship among the plurality of operation model identifiers represents the execution sequence in the constructed service flowchart, and represents an execution sequence of the plurality of operations in the to-be-orchestrated service.

In some embodiments, to reduce difficulty in orchestration and compilation of the to-be-orchestrated service, this embodiment of this application provides a graphical service programming environment, so that a user can quickly respond to a customized service requirement. In some embodiments, the provided graphical service programming environment is as follows: The plurality of operation model identifiers and the logical connection relationship are displayed on a user operation interface in a graphical manner, and the user operation interface herein is the graphical service programming environment. By designing the graphical service programming environment, a convenient innovation platform can be provided for an operator, so as to facilitate service innovation of the operator. The innovation platform integrates a network control development environment, a service provision development environment, and a service integration development environment, can provide the operator with a complete solution from innovative design to simple development, rapid deployment, and automatic maintenance, and can implement fast service customization for the operator and leisurely cope with complex operation and maintenance requirements.

To describe the plurality of graphical operation model identifiers and the graphical logical connection relationship in this embodiment of this application more clearly, this application provides the following example.

First, in this embodiment, based on a feature of an SDN transport service, some components are generated through open-source to represent operation models of a plurality of operations in the transport network service, and represent a logical model of an execution sequence among the plurality of operation models. Both the open-source operation models and logical model are referred to as transport network components, and the transport network components usually include a basic component, an enhanced component, and a logical component.

The basic component is configured to perform a basic management and control operation on a network device or a network service in the transport network. The basic management and control operation includes connection management and control, network element management and control, service model management and control, OAM management and control, and the like. The basic component is an SDN transport network operation model generated after secondary development or encapsulation is performed based on an NBI, a TAPI, or an IETF standard interface at the open SDN control plane, for example, a basic component "Create Service" representing a create operation, a basic component "Query Service" representing a query operation, a basic component "Update Service" representing an update operation, a basic component "Delete Service" representing a delete operation, and a basic component "Query Topology" representing a network topology query.

The enhanced component provides a general policy model, an algorithm model, and a standard service model for the basic management and control operation. The policy model provides an encapsulated policy for a user. For example, a time policy component "Timer" can provide common time policies such as timing and cycling. The algorithm model can provide algorithm functions such as basic path computation, network optimization, and service analysis.

The logical component provides various types of service logic for the basic management and control operation. The logical component is formed with reference to a program design principle and the feature of the transport service, includes mechanisms such as "Sequential Logic", "Parallel Gateway Logic", "Cycling", and "Event Triggering", and is configured to implement various logical combination relationships among basic components or enhanced components. For example, the logical component may be "Start (Start)", "End (End)", "Sequential Logic (Sequential Logic)", or "Parallel Gateway Logic (Parallel Gateway Logic)".

Certainly, the transport network components in this embodiment are not limited to the foregoing three components, and should also include independent components that are specially designed and implemented by a third party in the future. These independent components may have a special transport function. In this embodiment, these independent components are collectively referred to as third-party components. Certainly, the third-party components also include components that have a same function as the foregoing basic component, enhanced component, and logical component.

In addition, the operation mode identifier in this embodiment is an identifier of the basic component or the enhanced component in this embodiment. The logical connection relationship among the plurality of operation model identifiers in this embodiment of this application is an identifier of the logical component that represents the logical combination relationship among basic components or enhanced components in this embodiment of this application.

For example, the identifier of the basic component is "Create Service", "Query Service", "Update Service", "Delete Service", or "Query Topology". For example, the identifier of the enhanced component is "Timer", and the identifier of the logical component is "Start", "End", "Sequential Logic", "Parallel Gateway Logic", or the like.

Then, graphical representation of the plurality of operation model identifiers and the logical connection relationship is graphical representation of identifiers of the transport network components (including the basic component, the enhanced component, the logical component, and the third-party component).

The graphical operation model identifiers and logical connection relationship are illustrated. As shown in FIG. 4, identifiers such as "Create Service (Create Service)", "Query Service (Query Service)", "Update Service (Update Service)", "Timer (Timer)", "Start (Start)", "End (End)", "Sequential Logic (Sequential Logic)", and "Parallel Gateway Logic (Parallel Gateway Logic)" are displayed on the user operation interface in a manner of graph blocks. These graph blocks may be selected by the user to a service programming interface in various selection manners such as copy, paste, insert, drag, and import.

In this embodiment, a manner of graphical representation of the operation model identifiers and the logical connection relationship is not limited to displaying the identifiers of the transport network components in the graph blocks, and any other manners of graphical representation of the operation model identifiers and the logical connection relationship should fall within the protection scope of this embodiment of this application.

Based on the graphical operation model identifiers and the graphical logical connection relationship, when a service flowchart of a to-be-orchestrated service is being constructed, for the user, the service flowchart of the to-be-orchestrated service can be constructed provided that a plurality of operation model identifiers and a logical connection relationship are selected from the user operation interface. For a processor that performs service orchestration, the plurality of operation model identifiers and the logical connection relationship among the plurality of operation model identifiers that are selected by the user can be determined based only on a corresponding operation instruction on the user operation interface, so that the service flowchart of the to-be-orchestrated service can be determined.

In some embodiments, obtaining a service flowchart in step 301 includes: determining, based on an operation instruction of a user on the user operation interface, the plurality of operation model identifiers and the logical connection relationship that are selected by the user; and determining the service flowchart including the plurality of operation model identifiers and the logical connection relationship.

In some embodiments, the user may store the constructed service flowchart as a service template, and search for or select the stored service template when a similar service needs to be orchestrated subsequently, so as to obtain a service flowchart of the to-be-orchestrated service. Therefore, the obtained service flowchart may be a service flowchart directly selected from prestored service templates.

The plurality of operations in the to-be-orchestrated service necessarily need to be supported by some elements. These elements are referred to as scheduling parameters. However, each operation model identifier in the service flowchart of the to-be-orchestrated service is only an identifier of a basic component or an enhanced component.

Therefore, a scheduling parameter needs to be set for each operation model identifier in the constructed service flowchart. For example, one of the operations in the to-be-orchestrated service is "querying bandwidth ODU2 between a source node A and a sink node E". An operation model identifier of this operation may be only "Query Service", and query items that support this query operation are "source node A", "sink node E", and "bandwidth ODU2". Therefore, during service orchestration, these query items "source node A", "sink node E", and "bandwidth ODU2" further need to be orchestrated into the service flowchart as scheduling parameters. For the processor that performs service orchestration, the scheduling parameter that corresponds to each operation model identifier in the service flowchart needs to be obtained.

In this embodiment, for a programmer, the scheduling parameter that corresponds to each graphical operation model identifier in the service flowchart may be set by using the user operation interface.

In some embodiments, to avoid increasing a design burden of the programmer, a plurality of parameter options that can be selected are mapped to each operation model. For a selected parameter option, a scheduling parameter required by each operation in the to-be-orchestrated service may be set. Correspondingly, for the processor that performs service orchestration, a parameter option that corresponds to each operation model identifier needs to be prestored. For a parameter setting operation performed by the user on the user operation interface, a scheduling parameter that corresponds to each parameter option is stored.

In some embodiments, the obtaining a scheduling parameter that corresponds to each operation model identifier in step 302 includes:

determining, based on the operation instruction of the user on the user operation interface, the scheduling parameter that corresponds to each operation model identifier in the service flowchart. Specifically, the scheduling parameter that corresponds to each operation model identifier is determined based on a parameter option that is selected by the user and that corresponds to each operation model identifier, and a parameter value entered by the user for the selected parameter option.

To implement online compilation, before compilation, whether the scheduling parameter that corresponds to each operation model identifier in the preliminarily orchestrated service flowchart is valid needs to be verified, and whether service logic of the service flowchart is valid needs to be verified, and when the scheduling parameter is a resource that needs to be provided to execute the service flowchart (for example, a resource required for creating bandwidth ODU3 between the source node A and the sink node E), whether the resource that needs to be provided can be obtained from an SDN idle resource through application needs to be verified, or when the scheduling parameter is a resource that needs to be queried to execute the service flowchart (for example, a resource that needs to be queried to query the bandwidth ODU2 between the source node A and the sink node E), whether the resource that needs to be queried exists in SDN network-wide resources needs to be verified.

Based on this, optionally, for the processor that performs service orchestration, after the obtaining a scheduling parameter that corresponds to each operation model identifier, the method further includes the following steps:

(1) Perform logic verification on the logical connection relationship among the plurality of operation model identifiers in the service flowchart.

The logic verification is mainly for verifying whether the logical connection relationship among the plurality of operation model identifiers in the service flowchart is illogical.

(2) Perform semantic verification on scheduling parameters that respectively correspond to the plurality of operation model identifiers in the service flowchart.

The semantic verification on the scheduling parameters is mainly for verifying whether the scheduling parameters are valid.

(3) When the scheduling parameter is a live network resource that needs to be provided to execute the service flowchart, verify whether the live network resource that needs to be provided can be obtained.

It should be noted that, when the operation model identifier in the service flowchart is an identifier of an enhanced component, the scheduling parameter that corresponds to the operation model identifier is usually a specified time parameter, or an algorithm parameter and usually, no live network resource needs to be provided. Therefore, usually, no verification is performed by obtaining a live network status by using the control plane, and only semantic verification needs to be performed. However, a special case is not excluded.

When the operation model identifier in the service flowchart is an identifier of a basic component, in addition to that semantic verification is performed on the scheduling parameter that corresponds to the operation model identifier, a live network resource usually needs to be provided. Therefore, a live network status needs to be obtained by using the control plane, to perform verification.

Based on the SDN system architecture provided in the embodiment of this application, the live network resource that needs to be provided herein is a resource that needs to be scheduled from an SDN data plane when a scheduling parameter that corresponds to any operation model identifier in the service flowchart is verified, and the live network status obtained by using the control plane herein is a network-wide resource view contained at the SDN data plane based on the SDN system architecture. A resource status and a service status of any node device can be queried based on the network-wide resource view.

In some embodiments, when the scheduling parameter is the live network resource that needs to be provided to execute the service flowchart, the live network status is obtained by using the control plane, and whether the live network resource that needs to be provided can be obtained is verified based on the obtained live network status.

In some embodiments, obtaining the live network status by using the control plane includes: obtaining, by the processor that performs service orchestration, the live network status through a pre-created interaction interface for interaction with the control plane.

In some embodiments, the processor that performs service orchestration interacts with a central controller at the control plane, the processor that performs service orchestration may interact with an orchestrator at the control plane, or the processor that performs service orchestration may interact with a network management system at the control plane.

In some embodiments, when the live network status is obtained by using the control plane to verify the scheduling parameter, the invoked interaction interface is an NBI at the control plane in the SDN system architecture provided in the embodiment of this application. Optionally, the interaction interface for interacting with the control plane may be a TAPI standard interface specified by the ONF organization. Optionally, the interaction interface for interacting with the control plane may alternatively be an IETF standard interface.

In some embodiments, when the scheduling parameter is the live network resource that needs to be provided to execute the service flowchart, verifying whether the live network resource that needs to be provided can be obtained includes:

(a) when the scheduling parameter includes a resource that needs to be used to execute the service flowchart, verifying whether there is permission to apply for the resource that needs to be used from an SDN idle resource; and (b) when the scheduling parameter includes a resource that needs to be queried to execute the service flowchart, verifying whether the resource that needs to be queried exists in SDN network-wide resources When all of the foregoing verification items succeed, step 303 is performed, and specifically includes:

generating, based on the scheduling parameter that corresponds to each operation model identifier, a script file of an operation that corresponds to each operation model identifier; generating, based on the logical connection relationship and the script file of the operation that corresponds to each operation model identifier, the executable code for performing all operations in the service flowchart; and creating an interaction interface for interaction with the control plane, where the interaction interface is configured to apply to the control plane for the live network resource that needs to be provided to run the executable code.

The foregoing embodiment has described in detail that an operation model corresponding to each operation model identifier is an open-source basic component or enhanced component based on the SDN system architecture. In this embodiment, when each open-source basic component or enhanced component is invoked, an open-source description language of a corresponding operation may be formed based on a scheduling parameter that is set for the open-source basic component or enhanced component. Based on the prior art, the description language of the operation may be converted into a script file corresponding to the operation. Correspondingly, the logical connection relationship among the operation model identifiers is an open-source logical component based on the SDN system architecture. When each logical component is invoked, an open-source description language that describes a logical relationship among a plurality of operations corresponding to the plurality of operation model identifiers can be formed.

For example, an XML script of the operation that corresponds to each operation model identifier may be generated based on the scheduling parameter that corresponds to each operation model identifier, and an open-source description language of a basic component or an enhanced component that corresponds to each operation model identifier. An XML script file for performing all the operations in the constructed service flowchart may be generated based on the generated XML script of the operation that corresponds to each operation model identifier, and an XML script of the logical relationship among the plurality of operations corresponding to the plurality of operation model identifiers. Then, the XML script file for performing all the operations in the constructed service flowchart may be converted into the executable code for performing all the operations in the constructed service flowchart.

In some embodiments, a BPMN (business process modeling notation) transaction processing model may be used to convert the service flowchart that succeeds in verification into a business process execution language, and then convert the business process execution language into an executable program. A BPMN specification, for example, a business process execution language BPEL (business process execution language standard) standard, can support mapping from the created service flowchart to the business process execution language.

To run the compiled executable code online, when generating the foregoing executable code, the processor that performs service orchestration further needs to create the interaction interface used for interaction between the processor that performs service orchestration and the control plane. The interaction interface is configured to request the control plane to provide the live network resource for running the orchestrated executable code. The live network resource that needs to be provided herein is a resource that needs to be scheduled, during execution of the executable code of the orchestrated service flowchart, from the SDN data plane for a scheduling parameter that is set for an operation corresponding to any operation model identifier. The resource that needs to be scheduled from the SDN data plane includes a resource that needs to be applied for and/or a resource that needs to be queried.

It should be noted that, in a verification process, an objective of scheduling the resource from the SDN data plane by interacting with the control plane is to verify whether there is the resource that needs to be queried and whether there is permission to apply for the resource that needs to be applied for. When the executable code is run, an objective of scheduling the resource from the SDN data plane by interacting with the control plane is to apply for the resource that needs to be queried and the resource that needs to be used.

In some embodiments, based on the SDN system architecture provided in the embodiment of this application, the interaction interface created in step 303 for interaction between the processor that performs service orchestration and the control plane is the NBI at the control plane in the SDN system architecture.

In some embodiments, the interaction interface between the processor that performs service orchestration and the control plane may alternatively be a TAPI standard interface specified by the ONF organization.

In some embodiments, the interaction interface between the processor that performs service orchestration and the control plane may alternatively be the IETF standard interface.

Based on the created interaction interface between the processor that performs service orchestration and the control plane, after step 303, the processor that performs service orchestration further performs the following steps: obtaining, through the created interaction interface, the live network resource obtained through application; and running the executable code based on the live network resource obtained through application. Based on the SDN system architecture provided in the embodiment of this application, the live network resource obtained through application includes an SDN resource that needs to be queried to run the executable code and an SDN resource that needs to be used to run the executable code.

In this embodiment, the processor that performs service orchestration can run and manage the designed service. The successfully designed executable program may be referred to as a task. The processor that performs service orchestration may complete various types of management of a task state machine, for example, task management operations such as executing a task, suspending a task, modifying a task, and storing a task as a template. Specially, in an entire task management process, the processor that performs service orchestration needs to perform a verification operation for a plurality of times, and perform running state verification on logic of the task online by interacting with the control plane in real time, so as to ensure that the task can normally run in a live network.

In addition, in a process of running the executable code, the processor that performs service orchestration may further instruct, through the created interaction interface, the control plane to update the live network status based on the live network resource obtained through application. For example, the processor that performs service orchestration interacts with the control plane online through the interaction interface, to assist the control plane in completing, based on the live network resource obtained through application, resource management tasks of querying a bottom-layer resource, reserving a bottom-layer resource, and notifying a bottom-layer resource change.

It should be noted that various embodiments are applicable to an OTN (optical transport network) or a WDM (wavelength division multiplexing) network. An inventive concept of graphical service orchestration and online compilation in this application is also applicable to another network environment such as IP.

In this embodiment, the service flowchart including the plurality of operation model identifiers and the logical connection relationship among the plurality of operation model identifiers is constructed, so that preliminary orchestration of the to-be-orchestrated service is simplified. For the scheduling parameter that is set for the operation corresponding to each operation model identifier, when the scheduling parameter is a live network resource that needs to be provided to perform the corresponding operation, whether there is permission to obtain or there is the live network resource that needs to be provided to support execution of the orchestrated service flowchart may be verified online by interacting with the control plane. When the online verification succeeds, the orchestrated service flowchart is compiled into the executable code, so that online service compilation is implemented. Compared with the prior art, in an execution procedure in which the to-be-orchestrated service is preliminarily orchestrated by orchestrating the service flowchart, difficulty in service orchestration and compilation can be reduced. Feasibility verification on the orchestrated service is performed online through interaction with the control plane, and an orchestrated service that succeeds in the feasibility verification is further compiled, so that online orchestration and compilation of the customized service can be efficiently completed. Based on this, online orchestration and compilation can be performed based on different service requirements, so that current service requirements that are flexible and variable are met.

EXAMPLE 1

Based on the foregoing method procedure, an embodiment of this application provides a service orchestration method procedure for automatically creating a service at a specific time. Specifically, a service S1 is created at a moment t1, and the service S1 is an ODU service. Specifically, ODU2 from a node A to a node E is created. The method procedure includes the following steps.

Step 401: Determine, based on graphical "Create Service", graphical "Timer", and graphical "Start", "End", and "Sequential Logic" that are selected by a user, operation model identifiers "Create Service" and "Timer", and a logical connection relationship including "Start", "End", and "Sequential Logic".

Step 402: Obtain a service flowchart including the operation model identifiers "Create Service" and "Timer", and the logical connection relationship including "Start", "End", and "Sequential Logic".

Figure 5:
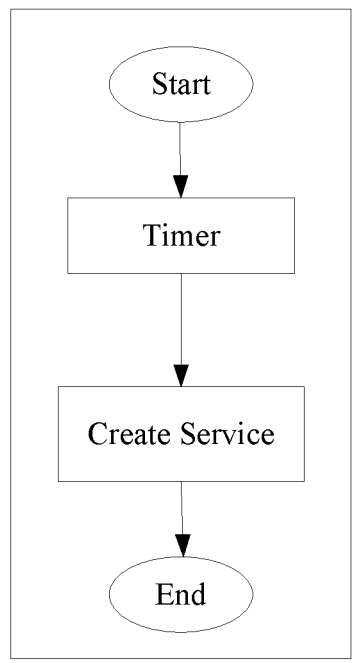
FIG. 5 is a schematic diagram of Example 1 of a constructed service flowchart according to an embodiment of this application.

Referring to FIG. 5, the service flowchart formed by connecting "Start (Start)", "Timer (Timer)", "Create Service (Create Service)", and "End (End)" in order is obtained.

Step 403: Determine, based on input of the user, a scheduling parameter that corresponds to each of the operation model identifiers "Create Service" and "Timer".

In some embodiments, the scheduling parameters that correspond to "Create Service" are determined as "source node A", "sink node E", and "bandwidth ODU2" based on three parameter items: "source node", "sink node", and "bandwidth" that correspond to "Create Service" selected by the user, and parameters: "node A", "node E", and "ODU2" that are respectively entered by the user in the three parameter items.

The scheduling parameter that corresponds to "Timer" is determined as t1 based on t1 entered in a parameter item that corresponds to "Timer" selected by the user.

Step 404: Perform logic verification on service logic of the service flowchart, and verify the scheduling parameters that correspond to "Create Service" and the scheduling parameter that corresponds to "Timer".

Optionally, a verification process includes the following verification items.

1. Verify whether semantics of the service logic is valid, for example, whether the service logic conflicts with other logic.

2. Verify whether semantics of the scheduling parameter t1 that corresponds to "Timer" is valid, where t1 can be only a future time, and cannot be a past time.

3. Verify whether data formats and data types of the scheduling parameters "source node A", "sink node E", and "bandwidth ODU2" that correspond to "Create Service" are valid and correct.

4. When verifying that the scheduling parameters that correspond to "Create Service" include a resource that needs to be queried, verify whether the resource that needs to be queried exists in SDN network-wide resources.

Before verification, network topology information, real-time network device information, and information about an available port between the "source node A" and the "sink node E" need to be obtained by using a control plane. Then, based on the obtained information, whether there is a normal "source node A" and a normal "sink node E" is verified, and whether there is an available port configured for ODU2 is verified. If there is the normal "source node A" and the normal "sink node E", and there is the available port configured for ODU2, a verification result of this verification is that the verification succeeds.

5. When verifying that the scheduling parameters that correspond to "Create Service" include a resource that needs to be used, verify whether there is permission to obtain the resource that needs to be used from an SDN idle resource through application.

Before this verification, related network operation authentication information, OAM information, idle resource information, and the like need to be obtained by using the control plane. Then, based on the obtained information, whether there is permission to perform an operation (for example, applying for a resource from SDN and creating the service S1 by using the resource obtained through application) on a network at the time t1 is verified, and whether there are sufficient resources to support creation of the ODU2 service from the node A to the node E is verified.

If there is permission to perform an operation on the network at the time t1, and there are sufficient resources to create the ODU2 service from the node A to the node E, this verification succeeds.

If verification in any one of the foregoing verification items fails, it is prompted to end this service orchestration task, so that a programmer resets a scheduling parameter that corresponds to each operation model identifier in the service flowchart.

If verification in all the foregoing verification items succeeds, a verification result is that the verification succeeds. In this case, a next step may be performed.

Step 405: Process the orchestrated service flowchart to generate an executable program such as Java code or C language code with reference to a BPMN transaction processing model and based on the orchestrated service flowchart, and the scheduling parameter t1 that corresponds to "Timer" and the scheduling parameters that correspond to "Create Service" in the service flowchart.

When executable code is generated, an interaction interface through which interaction with the control plane needs to be performed to schedule a resource during execution of the executable code is further created. For example, a service creation interface (an interface type of the service creation interface may be an NBI, a TAPI, or an IETF standard interface).

Step 406: Run the orchestrated executable program in a trial running mode through the created interaction interface for interacting with the control plane.

Based on the created interaction interface, a running process of the executable program is as follows: When t1 arrives, the service creation interface is invoked to obtain a resource required for creating the ODU2 service from the node A to the node E, and the ODU2 service from the node A to the node E is created based on the obtained resource.

In the running process of the executable program, online interaction may further be performed with the control plane, to assist the control plane in completing tasks such as querying a bottom-layer resource, reserving a bottom-layer resource, and notifying a bottom-layer resource change.

In the foregoing specific example, the service flowchart including "Create Service", "Timer", "Start", "End", and "Sequential Logic" is constructed, so that preliminary orchestration of the to-be-orchestrated service is simplified. For the scheduling parameters that are set for operations corresponding to "Create Service" and "Timer", when the scheduling parameters are live network resources that need to be provided to perform the corresponding operations, whether there are and there is permission to obtain the live network resources that need to be provided to support execution of the orchestrated service flowchart may be verified online by interacting with the control plane. When the online verification succeeds, the orchestrated service flowchart is compiled into the executable code, so that online service compilation is implemented. Compared with the prior art, in an execution procedure in which the to-be-orchestrated service is preliminarily orchestrated by orchestrating the service flowchart, difficulty in service orchestration and compilation can be reduced. Feasibility verification on the orchestrated service is performed online through interaction with the control plane, and an orchestrated service that succeeds in the feasibility verification is further compiled, so that online orchestration and compilation of the customized service can be efficiently completed.

EXAMPLE 2

Based on the foregoing method procedure, an embodiment provides a service orchestration method procedure for automatically updating a timing service. For example, a service S1 is updated to a service S2 at a moment t2, to be specific, an ODU2 service from a source node A to a sink node E is changed to an ODU3 service from the source node A to the sink node E. The method procedure includes the following steps.

Step 501: Determine, based on graphical "Query Service" (query operation model identifier) and "Update Service" (update operation model identifier), graphical "Timer", and graphical "Start", "End", and "Sequential Logic" that are selected by a user, operation model identifiers "Create Service", "Update Service", and "Timer", and a logical connection relationship including "Start", "End", and "Sequential Logic".

Step 502: Obtain a service flowchart including the operation model identifiers "Query Service", "Update Service", and "Timer", and the logical connection relationship including "Start", "End", and "Sequential Logic".

Figure 6:
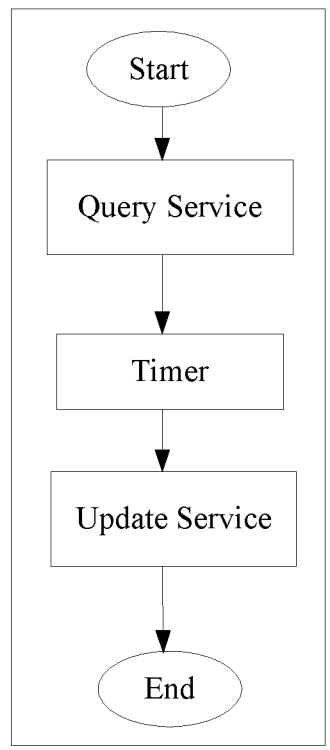
FIG. 6 is a schematic diagram of Example 2 of a constructed service flowchart according to an embodiment of this application.

Referring to FIG. 6, the service flowchart formed by connecting "Start (Start)", "Query Service (Query Service)", "Timer (Timer)", "Update Service (Update Service)", and "End (End)" in order is obtained.

Step 503: Determine, based on input of the user, a scheduling parameter that corresponds to each of the operation model identifiers "Query Service", "Update Service", and "Timer".

In some embodiments, the scheduling parameters that correspond to "Query Service" are determined as "source node A", "sink node E", and "bandwidth ODU2" based on three parameter items: "source node", "sink node", and "bandwidth" that correspond to "Query Service" selected by the user, and parameters: "node A", "node E", and "ODU2" that are respectively entered by the user in the three parameter items.

The scheduling parameters that correspond to "Update Service" are determined as "source node A", "sink node E", and "bandwidth ODU3" based on three parameter items: "source node", "sink node", and "bandwidth" that correspond to "Update Service" selected by the user, and parameters: "node A", "node E", and "ODU3" that are respectively entered by the user in the three parameter items.

The scheduling parameter that corresponds to "Timer" is determined as t2 based on t2 entered in a parameter item that corresponds to "Timer" selected by the user.

Step 504: Perform logic verification on service logic of the service flowchart, and verify the scheduling parameters that respectively correspond to "Query Service", "Update Service", and "Timer".

In some embodiments, a verification process includes the following verification items.

1. Whether semantics of the service logic is valid is verified, for example, whether the service logic conflicts with other logic is verified.

2. Whether semantics of the scheduling parameter t2 that corresponds to "Timer" is valid is verified, where t2 can only be a future time, and cannot be a past time.

3. Whether data formats and data types of the scheduling parameters "source node A", "sink node E", and "bandwidth ODU2" that correspond to "Query Service" are valid and correct is verified, and whether data formats and data types of the scheduling parameters "source node A", "sink node E", and "bandwidth ODU3" that correspond to "Update Service" are valid and correct is verified.

4. Whether a resource that needs to be queried to verify the scheduling parameters that correspond to "Query Service" and "Update Service" exists in SDN network-wide resources is verified.

Because the scheduling parameters that correspond to "Query Service" and

"Update Service" include the resource that needs to be queried, before verification, network topology information, real-time network device information, and information about an available port between the "source node A" and the "sink node E" need to be obtained by using a control plane. Then, based on the obtained information, whether there is a normal "source node A" and a normal "sink node E" is verified, whether the source node A and the sink node E support a bandwidth change is verified, whether there is a port for the ODU2 service from the source node A to the sink node E is verified, and whether there is an available port configured for ODU3 is verified. If there is the normal "source node A" and the normal "sink node E", there is the port for the ODU2 service from the source node A to the sink node E, there is the available port configured for ODU3, and the source node A and the sink node E support the bandwidth change, a verification result of this verification is that the verification succeeds.

5. Whether there is permission to obtain a resource that needs to be used from an SDN idle resource through application is verified.

Because the scheduling parameters that correspond to "Update Service" include the resource that needs to be used, before this verification, related network operation authentication information, OAM information, idle resource information, and the like need to be obtained by using the control plane. Then, based on the obtained information, whether there is permission to perform an operation on a network at the time t2 (for example, applying for a resource from SDN and creating the service S2 by using the resource obtained through application) is verified, and whether there are sufficient resources to support creation of the ODU3 service from the source node A to the sink node E is verified.

If there is permission to perform an operation on the network at the time t2, and there are sufficient resources to create the ODU3 service from the source node A to the sink node E, this verification succeeds.

If verification in any one of the foregoing verification items fails, it is prompted to end this service orchestration task, so that a programmer resets a scheduling parameter that corresponds to each operation model identifier in the service flowchart.

If verification in all the foregoing verification items succeeds, a verification result is that the verification succeeds. In this case, a next step may be performed.

Step 505: Process the orchestrated service flowchart to generate an executable program such as Java code or C programming language code with reference to a BPMN transaction processing model and based on the orchestrated service flowchart, and the scheduling parameter t2 that corresponds to "Timer" and the scheduling parameters that correspond to "Query Service" and "Update Service" in the service flowchart.

When executable code is generated, an interaction interface through which interaction with the control plane needs to be performed to schedule a resource during execution of the executable code is further created, for example, a service query interface and a service update interface (interface types of the service query interface and the service update interface may be an NBI, a TAPI, or an IETF standard interface).

Step 506: Run the orchestrated executable program in a trial running mode through the created interaction interface for interacting with the control plane.

Based on the created interaction interface, a running process of the executable program is as follows: The service query interface is invoked to query related information of the ODU2 service from the source node A to the sink node E, when t2 arrives, the service update interface is invoked to obtain a resource required for updating the ODU2 service from the source node A to the sink node E, and the ODU2 service from the source node A to the sink node E is changed to the ODU3 service from the source node A to the sink node E based on the obtained resource.

In the running process of the executable program, online interaction may further be performed with the control plane, to assist the control plane in completing tasks such as querying a bottom-layer resource, reserving a bottom-layer resource, and notifying a bottom-layer resource change.

Some other optional features in this embodiment of this application are the same as those in the foregoing method embodiment. For details, refer to description in the foregoing method embodiment, and details are not described herein again.

In the foregoing specific example, the service flowchart formed by connecting "Start", "Query Service", "Timer", "Update Service", and "End" in order is constructed, so that preliminary orchestration of the to-be-orchestrated service is simplified. For the scheduling parameters that are set for operations corresponding to "Query Service", "Timer", and "Update Service", when the scheduling parameters are live network resources that need to be provided to perform the corresponding operations, whether there are and there is permission to obtain the live network resources that need to be provided to support execution of the orchestrated service flowchart may be verified online by interacting with the control plane. When the online verification succeeds, the orchestrated service flowchart is compiled into the executable code, so that online service compilation is implemented. Compared with the prior art, in an execution procedure in which the to-be-orchestrated service is preliminarily orchestrated by orchestrating the service flowchart, difficulty in service orchestration and compilation can be reduced. Feasibility verification on the orchestrated service is performed online through interaction with the control plane, and an orchestrated service that succeeds in the feasibility verification is further compiled, so that online orchestration and compilation of the customized service can be efficiently completed.

EXAMPLE 3

Based on the foregoing method procedure, an embodiment provides a service orchestration method procedure for updating timing bandwidth. It is assumed that an ODU1 service from a source node A to a sink node E is referred to as a service S3 for short, an ODU0 service from the source node A to the sink node E is referred to as a service S4 for short, and an ODU2 service from the source node A to the sink node E is referred to as a service S5 for short. If a service that needs to be orchestrated is as follows: the service S3 is first created, the service S3 is changed to the service S4 in a time period T3 to T4 every day, and the service S4 is changed to the service S5 in a time period T5 to T6 every day, the method procedure includes the following steps.

Step 601: Determine, based on graphical "Create Service" (create operation model identifier) and "Update Service" (update operation model identifier), graphical "Timer", and graphical "Start", "End", and "Sequential Logic" that are selected by a user, operation model identifiers "Create Service", "Update Service", and "Timer", and a logical connection relationship including "Start", "End", "Sequential Logic (Sequential Logic)", and "Parallel Logic (Parallel Logic)", where there are two blocks of "Update Service" and two blocks of "Timer".

Step 602: Obtain a service flowchart including the operation model identifiers "Create Service", "Update Service", and "Timer", and the logical connection relationship including "Start", "End", and "Sequential Logic".

Figure 7:
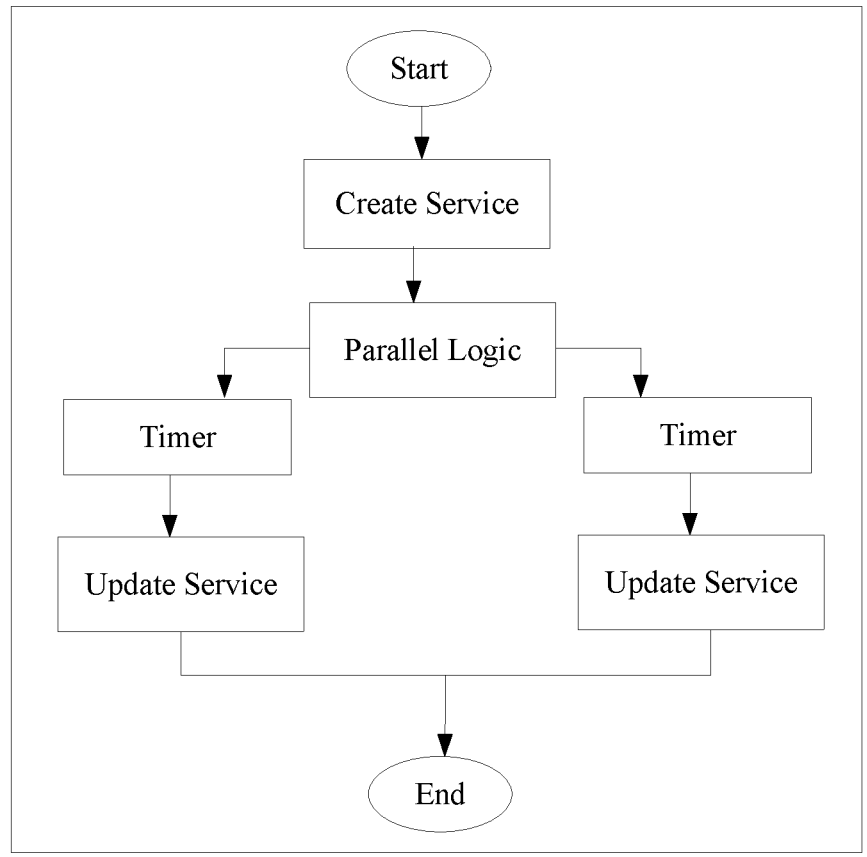
FIG. 7 is a schematic diagram of Example 3 of a constructed service flowchart according to an embodiment of this application.

Referring to FIG. 7, the service flowchart in which "Start (Start)", "Create Service (Create Service)", and "Parallel Logic (Parallel Logic)" are connected in order, two branches are formed after "Parallel Logic (Parallel Logic)", each branch is formed by connecting "Timer (Timer)" and "Update Service (Update Service)" in order, and each block of "Update Service (Update Service)" is connected to "End (End)" in order is obtained.

Step 603: Determine, based on input of the user, a scheduling parameter that corresponds to each of the operation model identifiers "Create Service", and "Update Service" and "Timer" that are in each branch.

In some embodiments, the scheduling parameters that correspond to "Create Service" are determined as "source node A", "sink node E", and "bandwidth ODU1" based on "node A", "node E", and "ODU1" that are entered by the user in parameter items that correspond to "Create Service".

The scheduling parameters that correspond to "Update Service" are determined as "source node A", "sink node E", and "bandwidth ODU0" based on parameters "node A", "node E", and "ODU0" that are entered in parameter items that correspond to "Update Service" that is selected by the user in a first branch.

The scheduling parameter that corresponds to "Timer" in the first branch is determined as "time period T3 to T4" based on "time period T3 to T4" entered in a parameter item that corresponds to "Timer" that is selected by the user and that is in the first branch.

The scheduling parameters that correspond to "Update Service" are determined as "source node A", "sink node E", and "bandwidth ODU2" based on parameters "node A", "node E", and "ODU2" that are respectively entered in parameter items that correspond to "Update Service" that is selected by the user in a second branch.

The scheduling parameter that corresponds to "Timer" in the second branch is determined as "time period T5 to T6" based on "time period T5 to T6" entered in a parameter item that corresponds to "Timer" that is selected by the user and that is in the second branch.

Step 604: Perform logic verification on service logic of the service flowchart, and verify the scheduling parameters that respectively correspond to "Create Service", "Update Service", and "Timer".

Optionally, a verification process includes the following verification items.

1. Whether semantics of the service logic is valid is verified, for example, whether the service logic conflicts with other logic is verified.

2. Whether semantics of the scheduling parameters "time period T3 to T4" and "time period T5 to T6" that correspond to "Timer" is valid is verified, and whether the time period T3 to T4 overlaps the time period T5 to T6 is verified.

3. Whether data formats and data types of the scheduling parameters "source node A", "sink node E", and "bandwidth ODU1" that correspond to "Create Service" are valid and correct is verified, and whether data formats and data types of the scheduling parameters "source node A", "sink node E", "bandwidth ODU0", and "bandwidth ODU2" that correspond to "Update Service" are valid and correct is verified.

4. Whether a resource that needs to be queried to verify the scheduling parameters that correspond to "Create Service" and "Update Service" exists in SDN network-wide resources is verified.

Because the scheduling parameters that correspond to "Create Service" and "Update Service" include the resource that needs to be queried, before verification, network topology information, real-time network device information, and information about an available port between the "source node A" and the "sink node E" need to be obtained by using a control plane. Then, based on the obtained information, whether there is a normal "source node A" and a normal "sink node E" is verified, whether the "source node A" and the "sink node E" support a bandwidth change is verified, and whether there are available ports respectively configured for ODU1, ODU0, and ODU2 is verified.

If there is the normal "source node A" and the normal "sink node E", there are the available ports respectively configured for ODU1, ODU0, and ODU2, and the source node A and the sink node E support the bandwidth change, a verification result of this verification is that the verification succeeds.

5. Whether there is permission to obtain a resource that needs to be used from an SDN idle resource through application is verified.

Because the scheduling parameters that correspond to "Update Service" include the resource that needs to be used, before this verification, related network operation authentication information, OAM information, idle resource information, and the like need to be obtained by using the control plane. Then, based on the obtained information, whether there is permission to perform an operation on a network in the time period T3 to T4 and the time period T5 to T6 is verified, whether there are sufficient resources to create the ODU1 service (namely, the service S3) from the source node A to the sink node E is verified, whether there are sufficient resources to change from the service S3 to the service S4 is verified, and whether there are sufficient resources to change from the service S4 to the service S5 is verified.

If there is permission to perform an operation on the network in the time period T3 to T4 and the time period T5 to T6, and there are sufficient resources to create the source service S3, change from the service S3 to the service S4, and change from the service S4 to the service S5, this verification succeeds.

If verification in any one of the foregoing verification items fails, it is prompted to end this service orchestration task, so that a programmer resets a scheduling parameter that corresponds to each operation model identifier in the service flowchart.

If verification in all the foregoing verification items succeeds, a verification result is that the verification succeeds. In this case, a next step may be performed.

Step 605: Process the orchestrated service flowchart to generate an executable program such as Java code or C programming language code with reference to a BPMN transaction processing model and based on the orchestrated service flowchart, and the scheduling parameter that corresponds to "Timer" and the scheduling parameters that correspond to "Create Service" and "Update Service" in the service flowchart.

When executable code is generated, an interaction interface through which interaction with the control plane needs to be performed to schedule a resource during execution of the executable code is further created, for example, a service creation interface and a service update interface.

Step 606: Run the orchestrated executable program in a trial running mode through the created interaction interface for interacting with the control plane.

Based on the created interaction interface, a running process of the executable program is as follows: The service creation interface is invoked to obtain a resource required for creating the service S3, and the ODU1 service from the source node A to the sink node E is created based on the obtained resource; when T3 arrives, the service update interface is invoked to obtain a resource required for changing from the service S3 to the service S4, the ODU1 service from the source node A to the sink node E is changed to the ODU0 service from the source node A to the sink node E based on the obtained resource, and the service S4 is maintained in the time period T3 to T4; and when T5 arrives, the service update interface is invoked to obtain a resource required for changing from the service S4 to the service S5, the ODU0 service from the source node A to the sink node E is changed to the ODU2 service from the source node A to the sink node E based on the obtained resource, and the service 5 is maintained in the time period T5 to T6.

In the running process of the executable program, online interaction may further be performed with the control plane, to assist the control plane in completing tasks such as querying a bottom-layer resource, reserving a bottom-layer resource, and notifying a bottom-layer resource change.

In the foregoing specific example, the service flowchart in which "Start", "Create Service", and "Parallel Logic" are connected in order, the two branches are formed after "Parallel Logic", each branch is formed by connecting "Timer" and "Update Service" in order, and each block of "Update Service" is connected to "End" in order is constructed, so that preliminary orchestration of the to-be-orchestrated service is simplified. For the scheduling parameters that are set for operations corresponding to "Create Service", each block of "Timer", and each block of "Update Service", when the scheduling parameters are live network resources that need to be provided to perform the corresponding operations, whether there are and there is permission to obtain the live network resources that need to be provided to support execution of the orchestrated service flowchart may be verified online by interacting with the control plane. When the online verification succeeds, the orchestrated service flowchart is compiled into the executable code, so that online service compilation is implemented. Compared with the prior art, in an execution procedure in which the to-be-orchestrated service is preliminarily orchestrated by orchestrating the service flowchart, difficulty in service orchestration and compilation can be reduced. Feasibility verification on the orchestrated service is performed online through interaction with the control plane, and an orchestrated service that succeeds in the feasibility verification is further compiled, so that online orchestration and compilation of the customized service can be efficiently completed.

Figure 8:
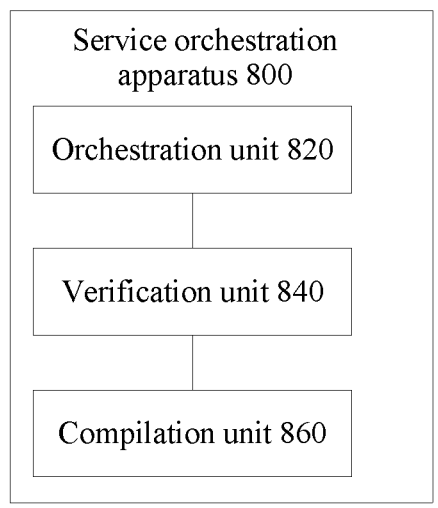
FIG. 8 is a schematic structural diagram of a service orchestration apparatus according to an embodiment of this application.
Figure 9:
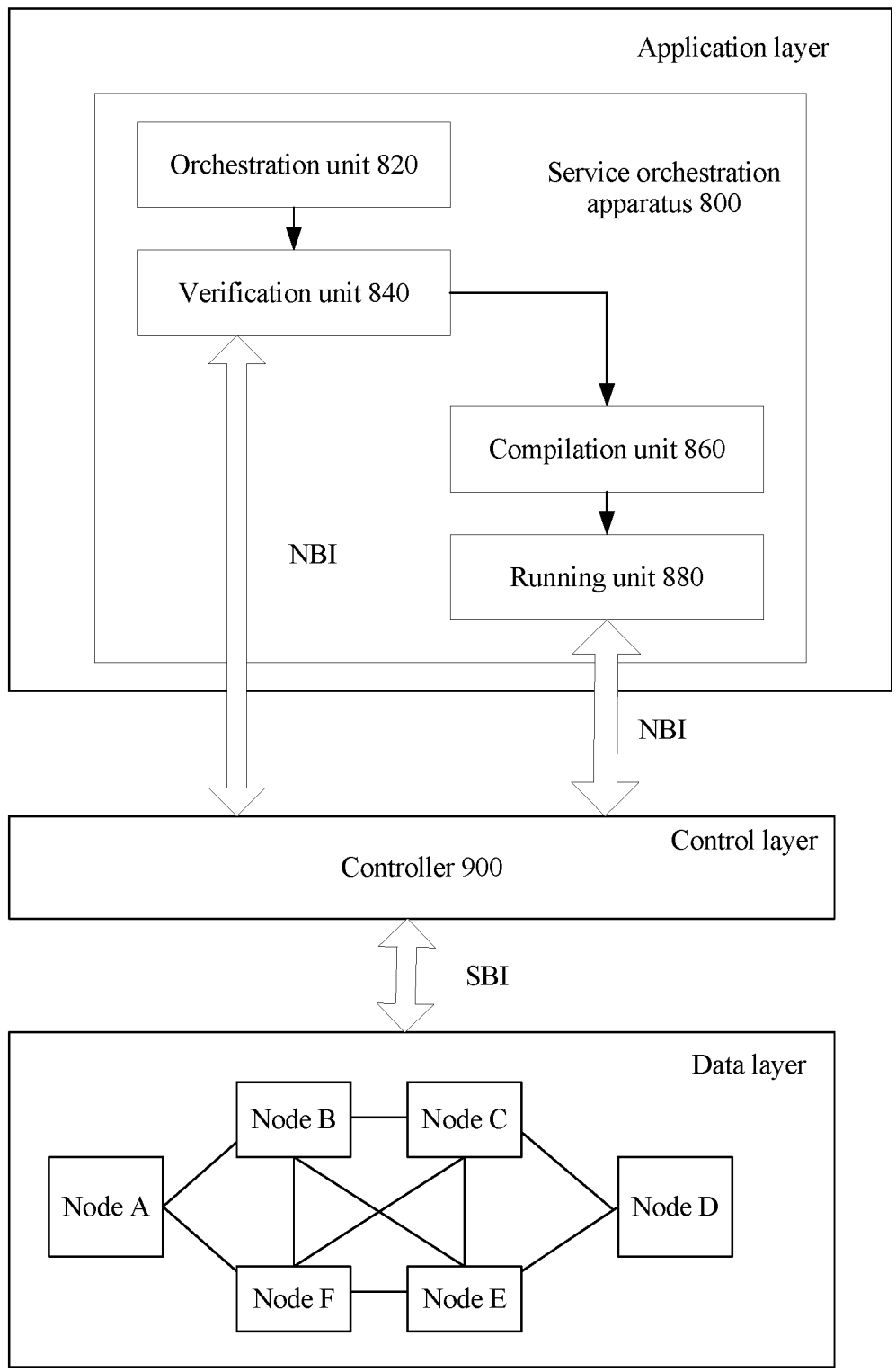
FIG. 9 is a schematic diagram of an SDN system architecture in which a service orchestration apparatus is deployed according to an embodiment of this application.

Based on a same inventive concept, as shown in FIG. 8, an embodiment in accordance with the present disclosure further provides a service orchestration apparatus 800. As shown in FIG. 9, the service orchestration apparatus 800 is located at an application plane in an SDN system architecture, a controller 900 is deployed at a control plane in the SDN system architecture, and a plurality of node devices that access the SDN are deployed at a data plane in the SDN system architecture, for example, a node A, a node B, a node C, a node E, and a node F shown in FIG. 9. For a topology diagram of these node devices, refer to FIG. 9. The controller 900 may obtain a topology diagram of the data plane, and further can perform resource management and service maintenance on each node device at the data plane. In this system architecture, the service orchestration apparatus 800 includes:

an orchestration unit 820, configured to obtain a service flowchart of a to-be-orchestrated service, where the to-be-orchestrated service is used to set a management and control operation for a transport network, the service flowchart includes a plurality of operation model identifiers and a logical connection relationship among the plurality of operation model identifiers, and the logical connection relationship is an execution sequence in the service flowchart; where the orchestration unit 820 is further configured to obtain a scheduling parameter that corresponds to each operation model identifier;

a verification unit 840, configured to: when the scheduling parameter obtained by the orchestration unit is a live network resource that needs to be provided to execute the service flowchart, obtain a live network status by using a control plane, and verify, based on the obtained live network status, whether the live network resource can be obtained; and a compiling unit 860, configured to: when the verification succeeds, generate, based on the logical connection relationship and the scheduling parameter that is obtained by the orchestration unit and that corresponds to each operation model identifier, executable code for executing the service flowchart.

In some embodiments, the plurality of operation model identifiers and the logical connection relationship are displayed on a user operation interface in a graphical manner, and the orchestration unit 820 is configured to:

determine, based on an operation instruction of a user on the user operation interface, the plurality of operation model identifiers and the logical connection relationship that are selected by the user; and determine the service flowchart including the plurality of operation model identifiers and the logical connection relationship.

Optionally, after the orchestration unit 820 obtains the scheduling parameter that corresponds to each operation model identifier, the verification unit 840 is further configured to:

perform logic verification on the logical connection relationship, and perform semantic verification on the scheduling parameter.

Optionally, the verification unit 840 is configured to:

obtain the live network status through a pre-created interaction interface for interaction with the controller 900 at the control plane, where for the interaction interface between the controller 900 at the control plane and the verification unit 840, refer to FIG. 9;

query, based on the live network status, whether the live network resource exists in the live network status; and/or determine, based on the live network status, whether there is permission to apply for the live network resource.

Optionally, the compilation unit 860 is configured to:

generate, based on the scheduling parameter that corresponds to each operation model identifier, a script file of an operation that corresponds to each operation model identifier;

generate, based on the logical connection relationship and the script file of the operation that corresponds to each operation model identifier, the executable code for performing all operations in the service flowchart; and create an interaction interface used for interaction between the controller 900 at the control plane and a running unit 880, where the interaction interface is configured to apply to the controller 900 at the control plane for the live network resource that needs to be provided to run the executable code.

Optionally, the service orchestration apparatus 800 further includes the running unit 880, and for the interaction interface between the controller 900 at the control plane and the running unit 880, refer to FIG. 9.

After the compilation unit 860 generates the executable code for executing the service flowchart, the running unit 880 is configured to: obtain, through the interaction interface, the live network resource obtained through application;

run the executable code based on the live network resource obtained through application; and assist, through the interaction interface and based on the live network resource obtained through application, the control plane in completing resource management tasks of querying a bottom-layer resource, reserving a bottom-layer resource, and notifying a bottom-layer resource change.

In this embodiment, the service orchestration apparatus constructs the service flowchart including the plurality of operation model identifiers and the logical connection relationship among the plurality of operation model identifiers, so that preliminary orchestration of the to-be-orchestrated service is simplified. For the scheduling parameter that is set for an operation corresponding to each operation model identifier, when the scheduling parameter is a live network resource that needs to be provided to perform the corresponding operation, the service orchestration apparatus may verify, online by interacting with the control plane, whether there is permission to obtain or there is the live network resource that needs to be provided to support execution of the orchestrated service flowchart. When the online verification succeeds, the service orchestration apparatus compiles the orchestrated service flowchart into the executable code, so that online service compilation is implemented. Compared with the prior art, in an execution procedure in which the to-be-orchestrated service is preliminarily orchestrated by orchestrating the service flowchart, difficulty in service orchestration and compilation can be reduced. Feasibility verification on the orchestrated service is performed online through interaction with the controller, and an orchestrated service that succeeds in the feasibility verification is further compiled, so that online orchestration and compilation of the customized service can be efficiently completed. Based on this, online orchestration and compilation can be performed based on different service requirements, so that current service requirements that are flexible and variable are met.

Some other optional features in this embodiment of this application are the same as those in the foregoing method embodiment. For details, refer to description in the foregoing method embodiment, and details are not described herein again.

Persons skilled in the art should understand that various embodiments may be provided as a method, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some optional embodiments of this application have been described, persons skilled in the art can make changes and modifications to these embodiments once they learn the basic inventive concept. Therefore, the appended claims are intended to be construed as to cover the embodiments and all changes and modifications falling within the scope of this application.

Obviously, persons skilled in the art can make various modifications and variations to this application without departing from the scope of this application. This application is intended to cover these modifications and variations of this application provided that they fall within the scope of protection defined by the following claims and their equivalent technologies.

What is claimed is:

1. A service orchestration method, wherein the method is implemented by a processor and comprises:

obtaining a service flowchart for a to-be-orchestrated service, wherein the service flowchart comprises a plurality of operation model identifiers and a logical connection relationship among the plurality of operation model identifiers, wherein the logical connection relationship indicates an execution sequence in the service flowchart;

obtaining a scheduling parameter corresponding to each operation model identifier, and when the scheduling parameter indicates a live network resource for executing the service flowchart to implement the to-be-orchestrated service, obtaining a live network status by using a control plane, and verifying, based on the obtained live network status, whether the live network resource is obtainable;

when the verification succeeds, generating, based on the logical connection relationship and the scheduling parameter corresponding to each operation model identifier, executable code for executing the service flowchart; and wherein after obtaining the scheduling parameter corresponding to each operation model identifier, the method further comprises:
performing semantic verification on the scheduling parameter, wherein performing semantic verification on the scheduling parameter includes determining whether service logic conflicts with other logic different from the service logic.

2. The method according to claim 1, wherein the plurality of operation model identifiers and the logical connection relationship are displayed on a user operation interface in a graphical manner; and
obtaining the service flowchart comprises:
determining, based on an operation instruction of a user on the user operation interface, the plurality of operation model identifiers and the logical connection relationship selected by the user.

3. The method according to claim 2, wherein after obtaining the scheduling parameter corresponding to each operation model identifier, the method further comprises:
performing logic verification on the logical connection relationship.

4. The method according to claim 3, wherein obtaining the live network status by using the control plane, and verifying, based on the obtained live network status, whether the live network resource can be obtained comprises:
obtaining the live network status through a pre-created interaction interface for interaction with the control plane;
querying, based on the live network status, whether the live network resource exists in the live network status; and
determining, based on the live network status, whether there is permission to apply for the live network resource.

5. The method according to claim 1, wherein generating, based on the logical connection relationship and the scheduling parameter corresponding to each operation model identifier, executable code for executing the service flowchart comprises:
generating, based on the scheduling parameter corresponding to each operation model identifier, a script file of an operation corresponding to each operation model identifier;
generating, based on the logical connection relationship and the script file of the operation corresponding to each operation model identifier, the executable code for performing all operations in the service flowchart; and
creating an interaction interface for interaction with the control plane, wherein the interaction interface is configured for requesting the control plane to provide the live network resource for running the executable code.

6. The method according to claim 5, after generating the executable code for executing the service flowchart, further comprising:
obtaining, through the interaction interface, the live network resource obtained through application;
running the executable code based on the live network resource obtained through the request; and
assisting, through the created interaction interface and based on the live network resource obtained through the request, the control plane to complete resource management tasks of querying a bottom-layer resource, reserve a bottom-layer resource, and notify a bottom-layer resource change.

7. The method according to claim 1, wherein performing semantic verification on the scheduling parameter further comprises:
verifying whether data formats and data types of the scheduling parameters are valid.

8. A service orchestration apparatus, comprising:
an orchestration unit, configured to obtain a service flowchart for a to-be-orchestrated service, wherein the service flowchart comprises a plurality of operation model identifiers and a logical connection relationship among the plurality of operation model identifiers, wherein the logical connection relationship indicates an execution sequence in the service flowchart; wherein
the orchestration unit is further configured to obtain a scheduling parameter corresponding to each operation model identifier, wherein after obtaining the scheduling parameter corresponding to each operation model identifier, the orchestration unit is further configured to:
perform semantic verification on the scheduling parameter, wherein performing semantic verification on the scheduling parameter includes determining whether service logic conflicts with other logic different from the service logic;
a verification unit, configured to: when the scheduling parameter obtained by the orchestration unit indicates a live network resource for executing the service flowchart to implement the to-be-orchestrated service, obtain a live network status by using a control plane, and verify, based on the obtained live network status, whether the live network resource is obtainable; and
a compilation unit, configured to: when the verification succeeds, generate, based on the logical connection relationship and the scheduling parameter that is obtained by the orchestration unit and corresponding to each operation model identifier, executable code for executing the service flowchart.

9. The apparatus according to claim 8, wherein the compilation unit is configured to:
generate, based on the scheduling parameter that corresponds to each operation model identifier, a script file of an operation corresponding to each operation model identifier;
generate, based on the logical connection relationship and the script file of the operation corresponding to each operation model identifier, the executable code for performing all operations in the service flowchart; and
create an interaction interface for interaction with the control plane, wherein the interaction interface is configured to request the control plane to provide the live network resource for running the executable code.

10. The apparatus according to claim 9, further comprising a running unit, wherein
after the compilation unit generates the executable code for executing the service flowchart, the running unit is configured to: obtain, through the interaction interface, the live network resource obtained through the request;
run the executable code based on the live network resource obtained through the request; and
assist, through the interaction interface and based on the live network resource obtained through the request, the control plane to complete resource management tasks of querying a bottom-layer resource, reserve a bottom-layer resource, and notify a bottom-layer resource change.

11. A server, comprising a processor, a transceiver, and a memory, wherein
the memory is configured to store one or more instructions, the processor is configured to: execute the one or more instructions stored in the memory, and control the transceiver to receive a signal and send a signal, and when the processor executes the one or more instructions stored in the memory, the processor is configured to:
obtain a service flowchart for a to-be-orchestrated service, wherein the service flowchart comprises a plurality of operation model identifiers and a logical connection relationship among the plurality of operation model identifiers, wherein the logical connection relationship indicates an execution sequence in the service flowchart;
obtain a scheduling parameter corresponding to each operation model identifier, and when the scheduling parameter indicates a live network resource for executing the service flowchart to implement the to-be-orchestrated service, obtain a live network status by using a control plane, and verify, based on the obtained live network status, whether the live network resource is obtainable;
when the verification succeeds, generate, based on the logical connection relationship and the scheduling parameter that corresponds to each operation model identifier, executable code for executing the service flowchart; and
wherein after obtaining the scheduling parameter corresponding to each operation model identifier, the processor is further configured to:
perform semantic verification on the scheduling parameter, wherein performing semantic verification on the scheduling parameter includes determining whether service logic conflicts with other logic different from the service logic.

12. The server according to claim 11, wherein the plurality of operation model identifiers and the logical connection relationship are displayed on a user operation interface in a graphical manner, and the processor is configured to:
determine, based on an operation instruction of a user on the user operation interface, the plurality of operation model identifiers and the logical connection relationship selected by the user.

13. The server according to claim 12, wherein after obtaining the scheduling parameter corresponding to each operation model identifier, the processor is further configured to:
perform logic verification on the logical connection relationship, and perform semantic verification on the scheduling parameter.

14. The server according to claim 13, wherein the processor is configured to:
obtain the live network status through a pre-created interaction interface for interaction with the control plane;
query, based on the live network status, whether the live network resource exists in the live network status; and
determine, based on the live network status, whether there is permission to apply for the live network resource.

15. The server according to claim 11, wherein the processor is configured to:
generate, based on the scheduling parameter corresponding to each operation model identifier, a script file of an operation that corresponds to each operation model identifier;
generate, based on the logical connection relationship and the script file of the operation that corresponds to each operation model identifier, the executable code for performing all operations in the service flowchart; and
create an interaction interface for interaction with the control plane, wherein the interaction interface is configured for requesting the control plane to provide the live network resource for running the executable code.

16. The server according to claim 15, wherein after generating the executable code for executing the service flowchart, the processor is further configured to:
obtain, through the interaction interface, the live network resource obtained through the request;
run the executable code based on the live network resource obtained through the request; and
assist, through the interaction interface and based on the live network resource obtained through application, the control plane to complete resource management tasks of querying a bottom-layer resource, reserve a bottom-layer resource, and notify a bottom-layer resource change.

* * * * *